United States Patent [19]

Malcolm-Brown

[11] Patent Number: 4,636,538
[45] Date of Patent: Jan. 13, 1987

[54] INTUMESCENT MATERIAL

[75] Inventor: Tessa Malcolm-Brown, Cambridge, England

[73] Assignee: Dixon International Limited, Cambridge, England

[21] Appl. No.: 644,110

[22] Filed: Aug. 23, 1984

[30] Foreign Application Priority Data

Aug. 23, 1983 [GB] United Kingdom ................. 8322643
Dec. 15, 1983 [GB] United Kingdom ................. 8333462

[51] Int. Cl.$^4$ .............................................. C08K 3/34
[52] U.S. Cl. .................................................... 523/179
[58] Field of Search ........................................ 523/179

[56] References Cited

U.S. PATENT DOCUMENTS

```
  830,329 10/1905  Kelly .
  933,645  4/1907  Guilleteau-Chaput .
2,103,461 12/1937  Hock .
2,241,801  5/1941  Yohe .
2,304,877 12/1942  Birnbaum .
2,650,206  8/1953  Stock .
2,806,012  9/1957  Allen .
2,821,514  1/1958  Sarbach .
3,654,190  4/1972  Levine .
4,198,328  4/1980  Bertelli .
4,341,694  7/1982  Halpern .
4,486,553 12/1984  Wesch ................................. 523/179
```

FOREIGN PATENT DOCUMENTS

```
2938874   4/1981  Fed. Rep. of Germany ...... 523/179
55-069628 5/1980  Japan .................................... 523/179
57-100963 6/1982  Japan .................................... 523/179
1095857  12/1967  United Kingdom ................ 523/179
1408133  10/1975  United Kingdom .
1601131  10/1981  United Kingdom .
2095683A 10/1982  United Kingdom .
```

Primary Examiner—Paul R. Michl
Attorney, Agent, or Firm—Lowe Price LeBlanc Becker & Shur

[57] ABSTRACT

An intumescent material comprises one or more organic polyhydroxy compounds, one or more organic polyamido compounds in free and/or combined form, an ammonium phosphate activator, an amino resin binder, and sodium silicate, the sodium silicate being present in sufficient amounts to prevent the material from totally intumescing quickly when subjected to elevated temperatures, the amounts of sodium silicate ranging from 3 to 12.7% by weight of the total composition but being present in at least 8.9% by weight of the ammonium phosphate activator.

15 Claims, No Drawings

INTUMESCENT MATERIAL

The present invention relates to intumescent material.

An intumescent material is a material which when heated or subjected to elevated temperature, as under fire conditions, expands to form a solid foam.

One known type of intumescent material comprises sodium silicate and glass fibre. The sodium silicate is hydrated and under fire conditions it gives off steam causing the material to intumesce. If the material is formulated, e.g. by the incorporation of acidic ingredients, so as not to exhibit an alkaline reaction in water it would not intumesce satisfactorily under fire conditions.

A second known type of intumescent material comprises components acting as carbonific, spumific, activator and binder.

The carbonific is a source of carbon char when the intumescent material is subjected to heat. It is the principal constituent of the foam formed on intumescence. Mono-, di- and tri-pentaerythritols, sugars and starch are examples of carbonifics.

The spumific decomposes under fire conditions and releases gases which cause the carbon char to expand. Polyamido compounds such as dicyandiamide and guanidine, in free or combined form, are examples of organic spumifics.

The activator promotes the decomposition of the carbonific. Ammonium phosphates such as monoammonium phosphate are examples of activators.

The binder may be an amino resin such as urea-formaldehyde resin or melamine-formaldehyde resin. The amino resin also acts to some extent as a carbonific and a spumific.

Thus the second known type of intumescent material may comprise an amino resin as binder and an ammonium phosphate such as monoammonium phosphate as activator, together with carbonific and spumific. Such a material needs to be formulated so as to exhibit an acidic reaction in water if it is to intumesce satisfactorily under fire conditions. This is because the ammonium phosphate has to yield phosphoric acid in order to promote the decomposition of the carbonific.

Intumescent materials of the second type and comprising amino resin as binder are disclosed in our British Pat. No. 1601131. Such intumescent material comprises melamine-formaldehyde resin cross-linked by a polyamido compound, the cross-linked resin acting as binder and the polyamido compound acting as spumific. The material also comprises an ammonium phosphate as activator and an organic polyhydroxy compound as carbonific.

Intumescent materials, as described above, made from cross-linked amino resins, such as melamine-formaldehyde resin, may be regarded as heavily filled amino resins and hence are stronger and less friable than sodium-silicate based intumescent material.

For many applications, intumescent materials based on amino resins, especially melamine-formaldehyde resin, may be considered superior to intumescent materials comprising sodium silicate in view of the above-mentioned differences in their properties.

However, sodium silicate itself costs much less than amino resins such as melamine-formaldehyde resin and hence intumescent materials based on sodium silicate can be manufactured at less cost than intumescent materials based on amino resins.

The above-described intumescent materials comprising amino resins was generally manufactured by making a thick aqueous slurry or paste of the required ingredients and allowing or causing the slurry or paste to harden.

In the case of intumescent materials as described in our aforementioned British patent, the thick aqueous slurry or paste is prepared from inter alia water-dispersible melamine-formaldehyde resin, a polyamido compound such as dicyandiamide as cross-linking agent for the resin and as spumific, and monoammonium phosphate.

It would not be thought that a satisfactory intumescent material comprising components acting as carbonific, spumific and binder, ammonium phosphate acting as activator, and also sodium silicate, could be manufactured at reduced cost (as compared with such a material without sodium silicate) because the alkalinity of the sodium silicate would be expected to prevent or hinder the yielding of phosphoric acid by the ammonium phosphate. Also in manufacturing the intumescent material, if sodium silicate were incorporated into the aqueous slurry or paste, it would be expected to react with the resin, which gives an acidic reaction in water, and prevent the resin cross-linking properly.

We have now surprisingly discovered that a satisfactory and, in some respects superior, intumescent material may comprise a carbonific, an organic spumific, an amino resin, such as cross-linked melamine-formaldehyde resin, as binder, and sodium silicate.

Accordingly the present invention provides an intumescent material comprising: one or more organic polyhydroxy compounds as carbonific; one or more organic polyamido compounds in free and/or combined form as spumific; an ammonium phosphate as activator for the carbonific; and an amino resin as binder, the material further comprising sodium silicate in an amount insufficient to prevent the material intumescing on being subjected to elevated temperature.

It will be understood that the sodium silicate in a sense constitutes a further spumific.

The proportions of the organic polyhydroxy compound, the polyamido compound, the ammonium phosphate, the amino resin, and any other ingredients (except sodium silicate) may be varied as described in our British Pat. No. 1601131.

The amino resin is preferably melamine-formaldehyde resin cross-linked by a polyamido compound, such as dicyandiamide or guanidine, which acts as spumific.

The carbonific may conveniently be pentaerythritol.

The activator is preferably monoammonium phosphate or may be ammonium polyphosphate.

In order to provide satisfactory intumescence, the amount of sodium silicate preferably does not exceed 12.7%, more preferably 11.5% by weight based on the total weight of the aforementioned carbonific, organic spumific (polyamido compound), activator and binder.

Preferably the amount of sodium silicate does not exceed 32.6%, more preferably 29.6%, by weight based on the ammonium phosphate.

Preferably the amount of sodium silicate does not exceed 36%, more preferably 32.8%, by weight based on the amino resin excluding any cross-linkages thereof (e.g. cross-linking polyamido compound where the resin is melamine-formaldehyde resin cross-linked by such polyamido compound).

Preferably the amount of sodium silicate does not exceed 68.5%, more preferably 62.3%, by weight based on the polyamido compound.

Preferably the amount of sodium silicate does not exceed 171%, more preferably 155%, by weight based on the polyhydroxy compound.

Preferably the amount of sodium silicate does not exceed 11%, more preferably 10%, by weight based on the ingredients of the material other than sodium silicate and any water present.

In order to provide a stiff "puff" as described below, the amount of sodium silicate preferably is at least 3.46% more preferably 4.6% by weight based on the total weight of the aforementioned carbonific, spumific (polyamido compound), activator and binder.

Preferably the amount of sodium silicate is at least 8.9%, more preferably 11.9%, by weight based on the ammonium phosphate.

Preferably the amount of sodium silicate is at least 9.8%, more preferably 13.1% by weight based on on the amino resin excluding any cross-linkages thereof (e.g. cross-linking polyamido compound where the resin is melamine-formaldehyde resin cross-linked by such polyamido compound).

Preferably the amount of sodium silicate is at least 18.7%, more preferably 24.9%, by weight based on the polyamido compound.

Preferably the amount of sodium silicate is at least 46.7%, more preferably 62.3%, by weight based on the polyhydroxy compound.

Preferably the amount of sodium silicate is at least 3%, more preferably 4%, by weight based on the ingredients of the material other than sodium silicate and any water present.

The intumescent material of the invention may further comprise polyvinyl acetate as additional binder to provide with the amino resin an interpenetrating polymer network system, thereby making the intumescent material less brittle. The intumescent material of the invention may further comprise a hardened setting agent such as hardened plaster of Paris.

The intumescent material according to the invention has a number of advantages, apart from its reduced cost, as compared with the second known type of intumescent material.

On heating intumescent material according to the invention, intumescence occurs in two stages. A first stage of intumescence occurs at a relatively low temperature due to the presence of the sodium silicate and the second stage of intumescence occurs at a somewhat higher temperature due to the ingredients of the second type of intumescent material. Moreover, the second stage intumescence tends to occur more slowly than if the sodium silicate were absent. Thus although the first stage intumescence may occur quickly, the second stage intumescence may be advantageously prolonged.

Moreover the intumesced material or "puff" resulting from heating of intumescent material according to the invention is stiff. In contrast the "puff" obtained from the conventional sodium silicate-based intumescent material is hard and the "puff" obtained from intumescent material of the second type is soft and elastic.

A stiff "puff" may be advantageous in certain situations for example in retarding warping of doors under fire conditions. Under such conditions a soft and elastic "puff" would deform easily to accomodate the warping of the door and may slump to leave a gap between the intumesced material and the door whereas a hard "puff" would crack and crumble and may tend to force the door open. However, a stiff "puff" has sufficient rigidity not to slump but does not tend to crack and crumble or to force the door open.

Moreover, when the intumescent material according to the invention intumesces through an opening in a holder it tends to expand in a direction normal to the opening rather than spreading laterally from the opening and can thus seal larger gaps than the known intumescent materials.

The degree of "puff" or intumescence of the intumescent material may be up to $\frac{1}{3}$ as large again as that of known intumescent materials of the second type and as described in our aforementioned British patent.

We have also found that the intumescent material according to the invention is not adversely affected by prolonged exposure to high concentrations of carbon dioxide or atmospheric moisture. The material can withstand 100% relative humidity without its intumescent properties being adversely affected.

We have furthermore found that the intumescent material according to the invention retains its intumescent potential well under accelerated ageing even for ageing equated with as much as ten years.

The intumescent material of the invention may be manufactured by preparing an aqueous paste or slurry comprising: one or more organic polyhydroxy compounds as carbonific, one or more polyamido compounds as spumific, an ammonium phosphate as activator and an amino resin as binder, and sodium silicate, and allowing or causing the paste or slurry to harden, the amount of sodium silicate being insufficient to prevent the material manufactured intumescing on being subjected to elevated temperature.

Preferably the amino resin is water-dispersible melamine-formaldehyde resin, which becomes cross-linked by the polyamido compound. The polyamido compound may be dicyandiamide or guanidine, which can effect cross-linking of melamine-formaldehyde resin at normal ambient temperature (15° to 25° C.).

The amount of sodium silicate in relation to the other ingredients of the material is preferably as specified above in relation to the intumescent material of the invention.

The aqueous paste or slurry may further comprise water-dispersible polyvinyl acetate and binder (in addition to the amino resin) for the purpose referred to above and a setting agent such as plaster of Paris.

Preferably the pH of the paste or slurry from which the intumescent material is prepared is not above 6.2, more preferably 6.1, otherwise the degree of intumescence of the material on heating may be inadequate.

We have found that the paste or slurry runs very smoothly and is thus advantageous for loading into holders in which it subsequently sets to form intumescent material. Also the paste or slurry tends to be less adherent to the equipment used in its preparation than the aqueous mixture used in preparing the known intumescent materials and thus leaves the equipment cleaner. Preferably the pH of the paste or slurry is about 6.15 to provide an optimum combination of smoothness of the paste or slurry and adequate intumescence of the intumescent material, although a lower pH would normally be chosen in order to provide greater intumescence.

The invention is illustrated by the following Examples:

The sodium silicate used in the Examples was commercially available sodium silicate having an SiO$_2$:-Na$_2$O molar ratio of 1:2. The plaster of Paris used in the Examples was of a kind which exhibits high expansion during setting.

EXAMPLE 1

A powder mix of the following ingredients in the stated amounts was prepared:

| | |
|---|---|
| water-dispersible melamine formaldehyde resin powder | 1900 g |
| monoammonium phosphate | 2100 g |
| dicyandiamide | 1000 g |
| pentaerythritol | 400 g |
| plaster of Paris | 550 g |
| water-dispersible polyvinyl acetate powder | 150 g |
| wood flour (passing through 90 mesh) | 125 g |
| Total | 6225 g |

100 parts by weight of this powder mix were mixed with various amounts of sodium silicate powder, the resulting mixture worked up with water and the pH of the worked-up mixture measured. The worked-up mixture was then allowed to set and dry. The set and dried mixture was then subject to elevated temperature to determine its degree of intumescence.

The results were as follows:

| Amount of sodium silicate (parts by weight) | pH | Intumescence | Remarks |
|---|---|---|---|
| 4 | <6 | good | stiff "puff" obtained |
| 6 | <6 | very good | stiffer "puff" obtained |
| 8 | ≈6 | very good | stiffest "puff" obtained |
| 10 | 6.1 | good | |
| 12½ | 6.5 | reduced | |
| 15 | 6.8 | poor | |

EXAMPLE 2

The following composition was made as a dry powder

| | |
|---|---|
| water-dispersible melamine-formaldehyde resin | 1900 g |
| monoammonium phosphate | 2100 g |
| dicyandiamide | 1000 g |
| pentaerythritol | 400 g |
| plaster of Paris | 550 g |
| water-dispersible polyvinyl acetate powder | 150 g |
| wood flour (passing through 96 mesh) | 125 g |
| sodium silicate powder | 498 g |

The amount of sodium silicate was thus 8% by weight based on the other ingredients.

Water was mixed with the above dry composition to form a thick aqueous slurry. The thick aqueous slurry was quickly poured into a tubular holder strip. The initial setting of the material started within 1-2 hours and chemical setting was well advanced after 2 days. The holder strip then slit along one face by a milling cutter and the holder with the hardened mixture was then kept at 40° C. for 24 hours to mature the hardened mixture (i.e. to allow free water to evaporate and to complete the chemical setting). The holder containing the intumescent material is referred to herein as a first sealing device.

A second sealing device was made in like manner to that described above but using no sodium silicate in preparing the aqueous slurry.

It was found that the crack resistance of the intumescent material in the two holders was substantially identical.

On heating the two sealing device, the material therein intumesced, the material made using sodium silicate intumescing about ⅓ more than the other material. The intumesced mass provided by first sealing device (and comprising sodium silicate) was stiff and that provided by the second sealing device was soft and elastic.

I claim:

1. An intumescent material which comprises the following components:
   (a) one or more organic polyhydroxy compounds in a carbonific effective amount;
   (b) one or more organic polyamido compounds in free and/or combined form in a spumific effective amount;
   (c) an ammonium phosphate in sufficient amounts to act as an activator for the carbonific effective compounds;
   (d) an amino resin binder; and
   (e) sodium silicate, said sodium silicate being present in an amount ranging from 3.0 to 12.7% by weight of the total composition but being present in at least 8.9% by weight of the ammonium phosphate activator;
   the paste from which said material is prepared having a pH not exceeding 6.2, and wherein, when heated, intumescence in said material occurs in two stages, a first stage at relatively low temperatures, and a second stage at higher temperatures, the intumescent characteristics of the material not being adversely affected by aging or by prolonged exposure to high concentrations of carbon dioxide or atmospheric moisture.

2. A material according to claim 1 wherein the amino resin binder (d) is melamine-formaldehyde resin.

3. A material according to claim 2 wherein the melamine-formaldehyde resin is cross-linked by the polyamido compound in the composition.

4. A material according to claim 1 wherein the amount of sodium silicate is no more than 32.62% by weight based on the ammonium phosphate.

5. A material according to claim 1 wherein the amount of sodium silicate is not more than 36% by weight based on the amino resin excluding any cross-linkages thereof.

6. A material according to claim 1 wherein the amount of sodium silicate is no more than 170% by weight based on the polyhydroxy compound.

7. A material according to claim 1 wherein the amount of sodium silicate does not exceed 11% by weight based on the total weight of the other ingredients of the material.

8. A material according to claim 1 wherein the amount of sodium silicate is at least 9.8% by weight based on the amino resin excluding any cross-linkages thereof.

9. A material according to claim 1 wherein the amount of sodium silicate is at least 18.7% by weight based on the polyamino compound.

10. A material according to claim 1 wherein the amount of sodium silicate is at least 46.7% by weight based on the polyhydroxy compound.

11. A material according to claim 1, wherein the amount of sodium silicate is at least 3% by weight based on the total weight of the other ingredients of the material.

12. An intumescent material which comprises the following components:
   (a) one or more organic polyhydroxy compounds in a carbonific effective amount;
   (b) one or more organic polyamido compounds in free and/or combined form selected from the group consisting of dicyandiamide and guanidine in a spumific effective amount;
   (c) an ammonium phosphate in sufficient amounts to act as an activator for the carbonific effective compounds;
   (d) a water-dispersable melamine-formaldehyde binder; and
   (e) sodium silicate, said sodium silicate being present in an amount ranging from 3.0 to 12.7% by weight of the total composition but being present in at least 8.9% by weight of the ammonium phosphate;
   said material having a pH not exceeding 6.2 and wherein, when heated, intumescence in said material occurs in two stages, a first stage at relatively low temperatures, and a second stage at higher temperatures, the intumescent characteristics of the material not being adversely affected by aging or by prolonged exposure to high concentrations of carbon dioxide or atmospheric moisture.

13. A material according to claim 12 which also contains a water-dispersable polyvinyl acetate as an additional binder and plaster of Paris as a setting agent.

14. A method for the manufacture of the intumescent material of claim 1 comprising:
   (a) mixing one or more organic polyhydroxy compounds in a carbonific effective amount, one or more organic polyamido compounds in free and/or combined form in spumific effective amounts, ammonium phosphate as an activator, an amino resin as a binder, and sodium silicate with sufficient water to produce an aqueous paste or slurry;
   (b) and permitting the paste or slurry to harden, the polyamido compound effecting cross-linking of the amino resin binder;
   wherein the pH of the resulting paste or slurry does not exceed 6.2.

15. A method according to claim 14 wherein the amino resin is a water-dispersable melamine-formaldehyde resin and the aqueous paste or slurry comprises sufficient polyamido compound to cross-link with said resin.

* * * * *